Patented Oct. 30, 1928.

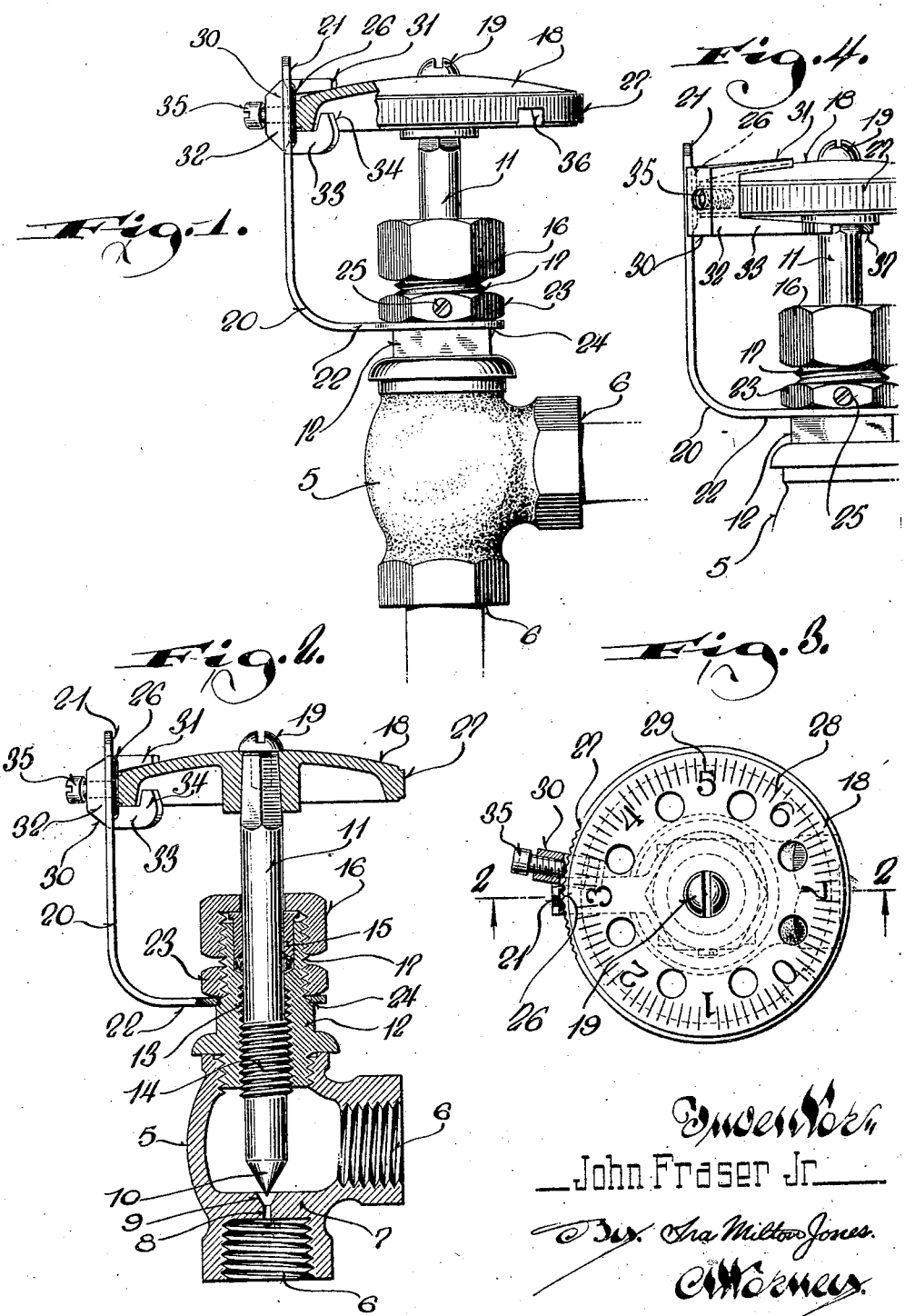

1,689,236

UNITED STATES PATENT OFFICE.

JOHN FRASER, JR., OF MILWAUKEE, WISCONSIN, ASSIGNOR TO MILWAUKEE VALVE COMPANY, OF MILWAUKEE, WISCONSIN, A CORPORATION OF WISCONSIN.

VALVE STRUCTURE.

Application filed December 14, 1925. Serial No. 75,306.

This invention relates to certain new and useful improvements in valve structures and has as one of its objects the provision of a resilient or tension finger for yieldably holding the valve against accidental movement and which cooperates with delineations on the hand wheel to indicate the position of the valve.

It is a further object of this invention to provide an improved valve construction of the character described in which the indicator is capable of ready adjustment to any desired point to compensate for wear or change in position of the valve stem, disc or seat.

A still further object of this invention resides in the provision of an adjustable stop which may be set at any desired position to permit the ready opening movement of the valve to the set degree.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated two complete examples of the physical embodiment of my invention constructed according to the best modes I have so far devised for the practical application of the principles thereof, and in which:

Figure 1 is a side view of a valve embodying my invention;

Figure 2 is a view, partly in section and partly in elevation, taken vertically through the valve on the plane of the line 2—2 of Figure 3;

Figure 3 is a top plan view of the valve, the adjustable stop carried by the hand wheel thereof being partly broken away, and Figure 4 is a fragmentary, elevational view illustrating a slightly modified form of adjustable stop.

Referring now more particularly to the accompanying drawing, in which like numerals designate like parts throughout the several views, the numeral 5 designates the body of a valve having an inlet and an outlet 6 separated by a partition 7 provided with a central port 8 having a tapered valve seat 9 for cooperation with a needle valve 10 formed on the lower or inner end of a valve stem or shank 11.

The valve illustrated in the drawing is of the right angle type and threaded or otherwise secured to the body 5, in axial alignment with the port 8, is a head member 12 having a centrally threaded bore 13 through which the valve stem passes, the stem being provided with a central threaded portion 14 engageable with the threads of the bore 13. The threads 14 may be any desired pitch so that one turn of the hand wheel fully opens or closes the port 8.

A stuffing box 15 surrounds the stem at the outer end of the head 12 to prevent leakage therepast and a cap 16 is threaded on the boss 17 of the head to permit the tightening of the packing within the stuffing box. A hand wheel 18 is mounted on the outer end of the valve stem by suitable fastening means 19 to permit the ready rotation of the stem to engage and disengage its needle valve with the valve seat.

Cooperating with the hand wheel is a combined indicating and friction member 20 which is preferably formed from a single length of yieldable metal bent to approximately right angular shape to provide an indicating finger 21 and an attaching portion 22. The attaching portion 22 of member 20 is preferably enlarged at its end and provided with an opening to receive the threaded boss 17 and is secured against rotation by a nut 23 threaded on the boss and adapted to bind the member 20 between it and a shoulder 24 formed at the inner end of the boss. The lock nut 23 is secured against accidental retrograde movement by a set screw 25.

The inner face of the indicating finger is provided with a longitudinal or elongated rib or bead 26 preferably formed by pressing the metal inwardly and which engages serrations or fine teeth 27 formed on the periphery of the hand wheel, there being sufficient tension on the indicating finger to frictionally engage the rib or bead with the serrations at all times to yieldably resist actuation of the valve. The top surface of the hand wheel is preferably graduated, as at 28, and provided with suitable delineations 29 which cooperate with the finger 21 to indicate the position of the valve.

In the event the threads 14 are of a character that one turn of the hand wheel effects the full opening of the valve, the valve may be instantly opened to any definite degree by rotating the hand wheel to align the indicating finger with the proper designation. It will, of course, be apparent that the indicating finger is set to align with zero when the valve is fully closed by first loosening lock nut 23, moving the finger to the desired position and then resetting the lock nut and tightening the set screw 25.

As it is often times desirable to bring the valve to one set position, a stop member 30 may be provided which may be set at any point on the hand wheel to engage the indicating finger when the wheel is rotated to open the valve a predetermined degree. The stop member 30 is preferably in the form of a clip having an arm 31 engageable on the top surface of the hand wheel, a portion 32 which engages against the peripheral portion thereof and an arm or end portion 33 which engages the under portion of the wheel and is directed upwardly, as at 34, to engage against the inner face of the peripheral flange of the wheel against which it is held by a set screw or binding member 35 threaded in the closed end 32 of the stop. As will be evident, the screw 35 may be loosened and the stop moved to any position on the hand wheel.

If desired, the space between the inturned portion 34 and the outer portion of the end 31 may be less than the thickness of the hand wheel to prevent its accidental detachment from the wheel in the event the screw 35 is loosened and the hand wheel is notched, as at 36, at some point to facilitate the securement of the stop on the wheel.

In Figure 4, a slightly modified type of adjustable stop is illustrated in which the arm 33 thereof is extended inwardly and enlarged, as at 37, to receive the valve stem. This form of stop pivots about the valve stem and is locked in adjusted position by the set screw 35.

What I claim as my invention is:

1. A valve structure, comprising a valve body having an inlet and an outlet, a port connecting the inlet and outlet, a valve member operable to close the port, a stem extending from the valve member outwardly of the valve body, an operating member on the stem, an indicating finger carried by the valve body and cooperating with delineations on the operating member to indicate the position of the valve, a substantially U-shaped stop member engaged over the periphery of the operating member and adjustable thereabout, and means for fixing the stop member with relation to the operating member, whereby the stop member cooperates with the indicating finger in the setting of the valve member at a desired point.

2. A valve structure, comprising a valve body having an inlet and an outlet, a port connecting the inlet and outlet, a valve member operable to close the port, a stem extending from the valve member outwardly of the valve body, an operating member on the stem, an indicating finger carried by the valve body and cooperating with delineations on the operating member to indicate the position of the valve, a substantially U-shaped stop member engaged over the periphery of the operating member and adjustable thereabout, one arm of the stop member providing a setting finger cooperating with the delineations on the operating member for the setting of the stop member, the other arm thereof engaging the valve member stem, and means for fixing the stop member with relation to the operating member, whereby the stop member cooperates with the indicating finger in the setting of the valve member at a desired point.

3. A valve structure, comprising a valve body having an inlet and an outlet, a port connecting the inlet and outlet, a valve member operable to close the port, a stem extended from the valve member outwardly of the valve body, an operating member on the stem, a resilient indicating finger carried by the valve body and cooperating with delineations on the operating member to indicate the position of the valve, the indicating finger frictionally restraining rotation of the operating member, and an adjustable stop carried by the operating member and cooperating with the indicating finger to permit movement of the operating member to a predetermined position as defined by the stop, said stop registering with the delineations on the operating member to facilitate its adjustment to any desired point.

In testimony whereof I affix my signature.

JOHN FRASER, Jr.